US007032036B2

(12) United States Patent
Linsley

(10) Patent No.: US 7,032,036 B2
(45) Date of Patent: Apr. 18, 2006

(54) WIRELESS BROWSER

(75) Inventor: David J. Linsley, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 628 days.

(21) Appl. No.: 10/175,776

(22) Filed: Jun. 20, 2002

(65) Prior Publication Data

US 2003/0041157 A1 Feb. 27, 2003

(30) Foreign Application Priority Data

Jun. 22, 2001 (EP) .................................. 01305442

(51) Int. Cl.
G06F 15/16 (2006.01)
(52) U.S. Cl. ....................... 709/250; 709/203; 709/219
(58) Field of Classification Search ................ 709/203, 709/219, 230, 250, 209
See application file for complete search history.

(56) References Cited

U.S. PATENT DOCUMENTS

| 5,142,528 | A * | 8/1992 | Kobayashi et al. ......... 370/469 |
| 5,933,784 | A * | 8/1999 | Gallagher et al. ........ 455/552.1 |
| 5,987,504 | A * | 11/1999 | Toga ........................... 709/206 |
| 6,336,137 | B1 * | 1/2002 | Lee et al. ................... 709/219 |
| 6,356,529 | B1 * | 3/2002 | Zarom ......................... 370/231 |
| 6,430,624 | B1 * | 8/2002 | Jamtgaard et al. .......... 709/246 |
| 6,446,096 | B1 * | 9/2002 | Holland et al. ............. 715/513 |
| 6,463,078 | B1 * | 10/2002 | Engstrom et al. ........... 709/203 |
| 6,501,956 | B1 * | 12/2002 | Weeren et al. .............. 455/463 |
| 6,647,260 | B1 * | 11/2003 | Dusse et al. ................ 455/419 |
| 6,675,219 | B1 * | 1/2004 | Leppinen et al. ........... 709/230 |
| 6,741,853 | B1 * | 5/2004 | Jiang et al. ................. 455/418 |
| 6,757,734 | B1 * | 6/2004 | Resenius et al. ............ 709/230 |
| 6,961,750 | B1 * | 11/2005 | Burd et al. ................. 709/203 |
| 2001/0047477 | A1 * | 11/2001 | Chiang ....................... 713/170 |
| 2002/0083182 | A1 * | 6/2002 | Alvarado et al. ........... 709/231 |
| 2002/0099798 | A1 * | 7/2002 | Fedorovsky et al. ........ 709/219 |
| 2002/0103936 | A1 * | 8/2002 | Jano et al. .................. 709/246 |
| 2002/0124057 | A1 * | 9/2002 | Besprosvan ................. 709/219 |

OTHER PUBLICATIONS

Fielding et al. (RFC 2616)—"Hypertext Transfer Protocol—HTTP/1.1"; UC Irvine; pp. 1-176; Jun. 1999.*
"Wireless Application Protocol Specification"; (WAP-203-WSP); Wireless Application Protocol Forum, Ltd. pp. 1-122; May 2000.*

* cited by examiner

Primary Examiner—Beatriz Prieto
Assistant Examiner—Michael D. Meucci
(74) Attorney, Agent, or Firm—Workman Nydegger

(57) ABSTRACT

A device for accessing data from an internet site. The device comprises at least two protocol modules, each module comprising instructions enabling the device to communicate with an external internet resource under a first protocol or a second protocol respectively; the device being arranged to selectively employ one or the other of the modules. Request data receiving component receives request data relating to a requested site from a user, and a data requesting module for requests, dependent upon the request data, data from an external internet resource. A received data determining component determines if data received as a result of the requested data refers to a site with data under the first protocol or the second protocol, and a router determines the route of the request and resubmitting the request to the requested site via the determined route dependent upon the determination of the request being through the first or second protocol.

21 Claims, 3 Drawing Sheets

WIRELESS BROWSER

CROSS-REFERENCE TO RELATED APPLICATIONS

The present application claims priority from European patent application Serial No. EP 01305442.4,filed Jun. 22, 2001,and entitled "Wireless Browser" which application is incorporated herein by reference in its entirety.

BACKGROUND OF THE INVENTION

1. The Field of the Invention

This invention related to browsers and, particularly, to browsers for use on wireless devices, such as mobile phones.

2. Background and Relevant Art

Mobile browsers to enable devices such as mobile telephones to access the internet are becoming widely available. Wireless application protocol (WAP) is currently the preferred solution for authoring and accessing resources on the internet via mobile devices.

WSP is the protocol for providing resource identification for operation under the WAP protocol. With WAP, textual content is written in wireless markup language (WML), and much effort is currently being spent in order to generate content in this language. However, the generally accepted standard for internet material of a textual nature is hypertext mark up language (HTML). This means that a considerable amount of readily available content, in the form of HTML content, is not directly available to a device adapted for WML.

Attempts have been made to overcome this problem by providing mobile devices with dual mode browsers with the capability to access both WTML and HTML sites. Such an approach to the above problem does, however, introduce further problems.

Firstly, if a browser is provided both for WML and HTML then it is necessary for the user to be aware of the need to switch between the browsers as appropriate.

Furthermore, providing dual browser capability can cause problems in that within one browser the device may attempt to access a site which is in the other browser's format, continuing compatibility problems and leading to the display of illegible and confusing information to the user. This is because the Uniform Resource Identifier (URI) used to name WSP resources with the WAP protocol also use the "http:"and "https:" prefixes employed by the HTML protocol, hypertext transfer protocol (HTTP). Information for the two protocols can be found at HTTP-RFC 2616 Hypertext Transfer Protocol-HTTP/1.1 and WSP Protocol: WAP-203-WSP.

The URI of the resource does not explicitly specify which protocol data it contains and therefore which protocol should be used to access it. Accordingly, there is no ready indication to a browser employing one type of protocol that the data it has requested is not compatible with that protocol. Although some content (such as images) are suitable for access by WAP or HTTP, content authored in WML and WML Script are not.

In addition, to reduce over the air transmission of WAP content most mobile devices do not request the resource directly from the location of the resource. Instead such devices connect to a WAP gateway with the WSP protocol and informs it of the URI of the resources. The gateway then accesses the resource and converts WML and WML Script content into a binary encoding that is smaller in size. A device therefore must be able to process this encoding but does not have to process the original encoding. However, if accessed via HTTP the original encoding of the resource would be accessed and so the device would not be able to display the content. Furthermore, in such situations avoidance of connection with the gateway means that optimum use of the data reduction benefits of such protocols is not employed, delaying display of data because of the processing strain that is put on the mobile device. Additionally for security or other reasons, the content may only be available if accessed via WSP and the WAP gateway and not via HTTP, leading the user frustration when a site cannot apparently be accessed.

The present invention seeks to overcome some of the above problems.

BRIEF SUMMARY OF THE INVENTION

According to the present invention there is provided a device for accessing data from an internet site, the device comprising:

at least two protocol modules, each module comprising instructions enabling the device to communicate with an external internet resource under a first protocol or a second protocol respectively;

a request data receiving component for receiving request data relating to a requested site from a user;

a data requesting module for requesting, dependent upon the request data, data from an external internet resource.

a received data determining component for determining if data received as a result of the request data refers to a site with data under the first protocol or the second protocol; and a route determining device for determining the route of the request and resubmitting the request to the requested site via the determined route dependent upon the determination of the request being through the first or second protocol.

The route determining device may be configured to always direct the route to a gateway employing the first protocol even if it is determined that the requested data is in the second protocol if the first protocol module is that which is in use.

The first protocol may be the WAP protocol. The second protocol may be HTTP protocol.

The protocol determination module which determines the protocol used for access may further comprise a component for determining the protocol module being employed by the device the request is made. The data requesting component may be configured to request data both for WAP sources and HTTP sources.

A corresponding method and a computer-readable storage medium with instructions for performing the method are also provided.

BRIEF DESCRIPTION OF THE DRAWINGS

With the present invention, a mobile device has the capability to access the data in accordance with one or more internet protocols, such as the WAP or HTTP protocol. However, by determining the protocol in which the device is operating when a request is made by a user, determining the format of received data and selecting the gateway through which the request is made when appropriate, the device ensures that data provided to it is requested and obtained only in a format that is acceptable to the current protocol at the time of making the request. This means that the device cannot inadvertently request data in any incorrect protocol and avoids the display of incorrect data or the need for a user to be aware of the current protocol when making requests.

An example of the present invention will now be described in reference to the accompanying drawings, in which.

DETAILED DESCRIPTION OF THE PREFERRED EMBODIMENTS

Figure 1:
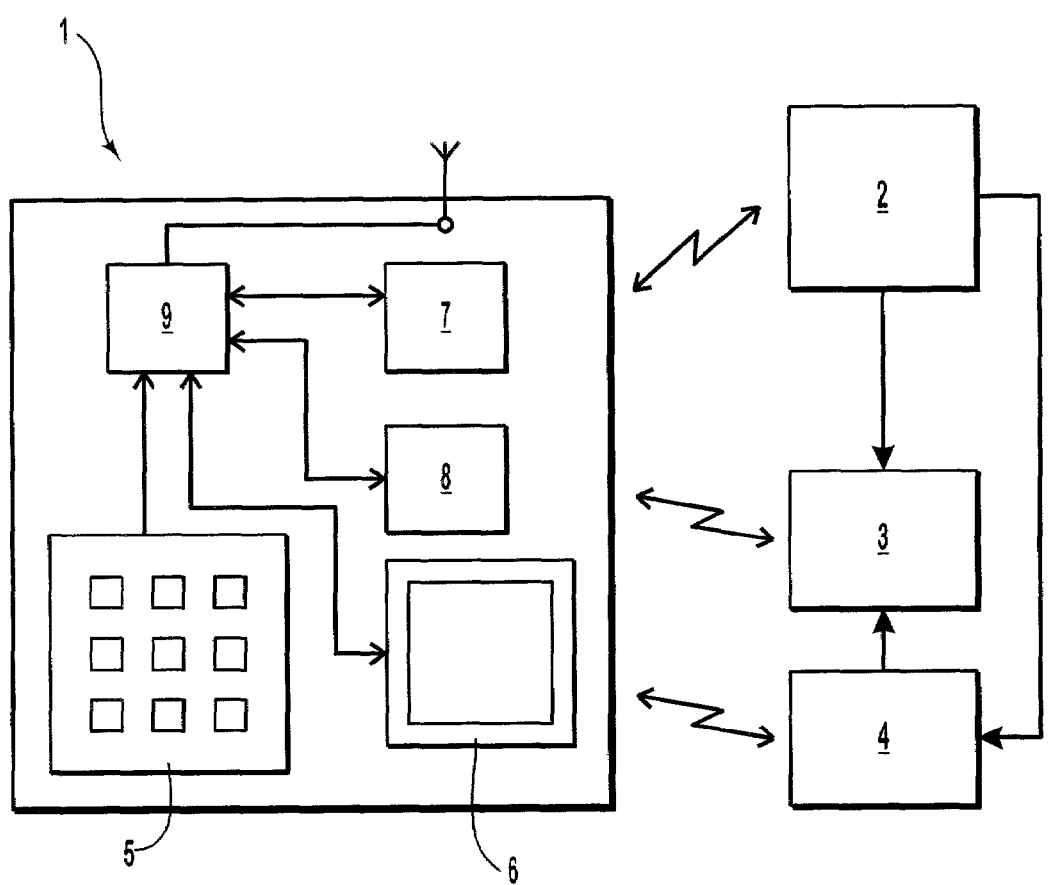
FIG. 1 is a schematic block diagram of components of a mobile internet browser system.

Referring to FIG. 1, a known mobile internet browsing device 1 has known protocol access modules 7, 8 stored thereon. The mobile device may be a hand-held computer, a laptop computer with a wireless modem, or may be a mobile telephone with appropriate internet capability.

In general terms, the device 1 has protocols stored thereon in the form of computer-readable instructions in modules 7, 8 to enable access to remote data sources in two or more protocol formats. The mobile device 1 is configured in a dual-mode format, so that, in this example, it can access content both in WML and HTML formats as discussed above and acts as a browser under appropriate instruction of its processor 9. The device 1 may be configured as a two way communication device using internet protocols, however, in which case it may not have browsing capability.

In use, the mobile device 1 communicates, under user instructions, either with a gateway 2 in order to gain access to a requested resource 3 or directly to a requested resource 3. The request may also go via a referring resource 4. Access is gained by the mobile device 1 to the resource by being specified, from user input with an input device 5, with a URI representative of the requested resource. This is in accordance with the standard procedure in both WAP and HTTP protocols.

As also discussed above, prior art mobile devices, even if they have dual mode capabilities can, with such a configuration, inadvertently access material which is in a format that is not able to be processed by the mobile device whilst it is operating under a particular protocol. As discussed above, when the mobile device 1 is operating under one protocol (e.g., HTTP) it may not display WML format data correctly if it receives it, but cannot distinguish data type when making a request as the URI address cannot indicate data type. Also, the mobile device 1 is configured, in order to reduce the amount of data that is needed to be transmitted and processed, to accept WAP protocol data from the gateway 2. In this regard, the gateway 2 itself is configured to parse data that it receives from resources to reduce the volume of data to be transmitted wirelessly and to reduce the processing requirements of the mobile device 1. This causes no difficulty if the requested resource 3 is in the WML format or if it is accessed via the gateway 2 which makes my necessary conversion in format. However, as can be seen from the example of flow A in FIG. 3, if the mobile device 1 is in a HTTP browser mode a user may select a site (e.g., www.Microsoft.com) which has WML format. Having done this, the mobile device 1 goes directly to the requested resource. The mobile device 1, being unable to process the resource data as it is in WML format and is operating in the HTTP protocol browser configuration at that point, either makes no display or displays illegible information on a display 6. It also does this very slowly, given the increased data volume that is transmitted. The present invention, however, overcomes this problem.

Figure 2:
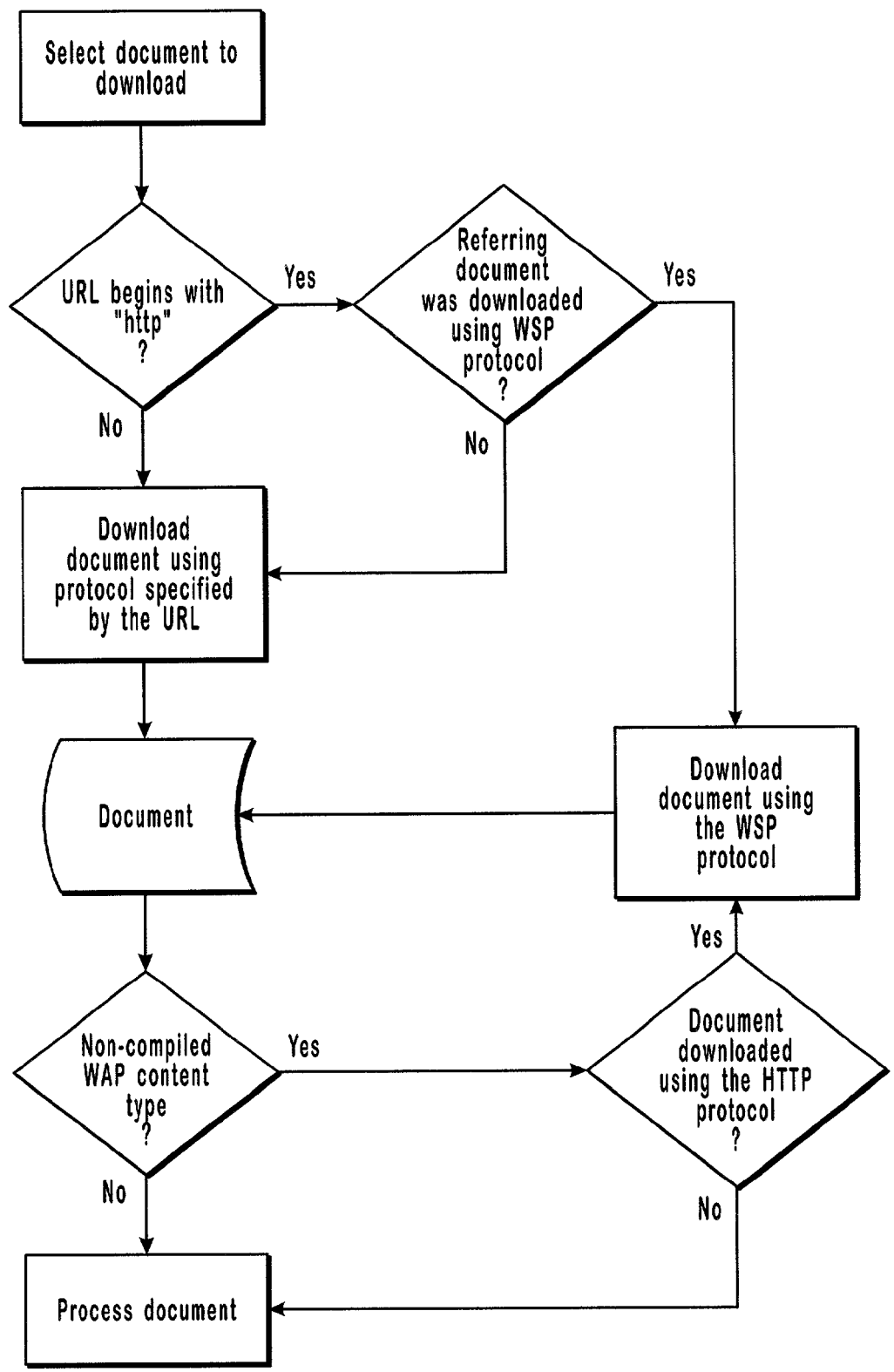
FIG. 2 is a flow diagram showing operation of the invention.
Figure 3:
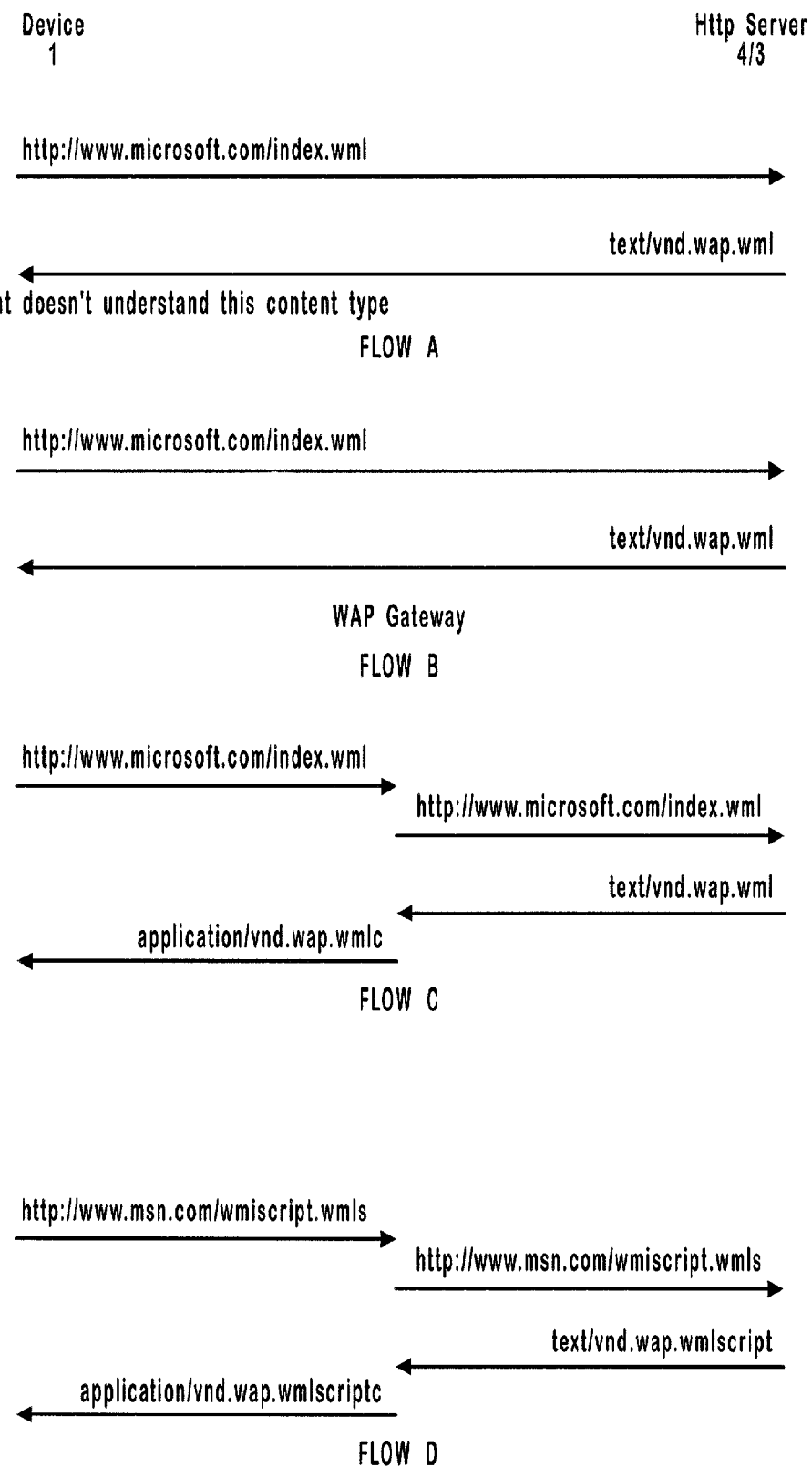
FIG. 3 shows the flow of data in a system with a mobile device according to the invention.

The flow of operation of the invention is shown in FIG. 2 and the data flow in FIG. 3. If a device according to the invention is operating under HTTP protocol 7 then requests are made by a user by specifying URL (http:) in a manner that will be well known to anybody who browses the internet on the input device 5. The request for data is passed via a gateway 2 without interruption to a web server which may itself be a resource 3 or may be a referring resource 4. Data is then returned as appropriate if the requested data is not using WML. The device 1 monitors, however, in its processor 9 for the protocol format of the received data. If the received data is not in HTML, but is in WML, this is flagged by the device and the request is resubmitted to the gateway 2 in WSP protocol by the processor 9, and the device 1 itself switches to operate under its WAP browser by employing protocol 7. The gateway recognizes the identifier, intercepts the request, then directs the request on to a web server and/or on to the appropriate resource using the original HTTP prefix so that the serve r or resource then directs the information back to the gateway 2, rather than to the device 1. The gateway 2 can then process the received data to ensure that it is formatted correctly to provide all the benefits of the WAP protocol (flows B and C, FIG. 3).

The device 1 then continues in this mode, directing everything via the gateway 2 by appropriate configuration of the processor 9 in configuration with protocol module 8. The device may also be combination so that the processor 9 identifies and adapt and addresses within the data that is received so that HTTP addresses that are referred to in the data are also adapted to have a WSP identifier so that selection by a user of the embedded addresses will also result in data transfer being intercepted and converted at the gateway as necessary (flow D, FIG. 3).

With this configuration there is, of course, the additional benefit that the gateway 2 can be operated as a data cache, reducing amount of information that needs to be stored on the mobile device 1, but still ensuring ready access to that data as required. This reduces the memory capacity required by the mobile device 1.

If it is desired by a user to switch the device back into HTTP browsing mode then an alternative identifier (for example, "HTTP"), can be employed in order to trigger the device to switch into the HTTP browser module 7. This may also be done automatically if the processor 9 recognizes that an address that is being requested is in HTTP protocol when data is received and informs the gateway 2. The request is then transmitted directly through the gateway without being intercepted and adapted.

What is claimed is:

1. A device for accessing data from an internet site, the device comprising:
   a processor;
   at least two browsers that are compatible with two different protocols, respectively; and
   computer-readable instructions stored on the device, which when executed:
   receives data relating to a requested site from a user;
   requests data from the requested site according to a first protocol which is compatible with a first browser that the device is presently in a mode for using;
   receives data in response to the request;
   determines if the received data is compatible with the first protocol and under which the first browser of the device is operating; and
   when it is determined that the received data is of a different protocol than the first protocol, performs the following:

flagging the data and resubmitting the request for data according to a second protocol; and switching the device's mode of browser use from the first browser, which is compatible with the first protocol, to use of a second browser, which is compatible with the second protocol.

2. The device according to claim 1, wherein a route determining device is configured to always direct the route through a resource employing the first protocol, even when it is determined that the request data is in the second protocol, if the device is employing the first browser.

3. The device according to claim 2, wherein the first protocol is WAP.

4. The device according to claim 3, wherein the second protocol is HTTP.

5. The device according to claim 2, wherein the second protocol is HTTP.

6. The device according to claim 1, wherein the first protocol is WAP.

7. The device according to claim 6, wherein the second protocol is HTTP.

8. The device according to claim 1, wherein the second protocol is HTTP.

9. The device according to claim 1, wherein a component for determining the protocol used for access comprises means for determining the browser being employed by the device when the request is made.

10. The device according to claim 1, wherein the browsers are internet capable browsers.

11. A method for accessing data from an internet site from a device capable of accessing data in at least two different protocols, the method comprising:

receiving data relating to a requested site from a user;

requesting data from the requested site according to a first protocol which is compatible with a first browser that the device is presently in a mode for using;

receiving data in response to the request;

determining if the received data is compatible with the first protocol and under which the first browser of the device is operating; and when it is determined that the received data is of a different protocol than the first protocol, performing the following:

flagging the data and resubmitting the request for data according to a second protocol; and switching the device's mode of browser use from the first browser, which is compatible with the first protocol, to use of a second browser, which is compatible with the second protocol.

12. The method according to claim 11, wherein the first protocol is WAP.

13. The method according to claim 12, wherein the second protocol is HTTP.

14. The method according to claim 13, wherein determining if the received data is compatible with the first protocol further comprises determining the browser being employed by the device when the request is made.

15. The method according to claim 12, wherein determining if the received data is compatible with the first protocol further comprises determining the browser being employed by the device when the request is made.

16. The method according to claim 11, wherein the second protocol is HTTP.

17. The method according to claim 11, wherein determining if the received data is compatible with the first protocol further comprises determining the browser being employed by the device when the request is made.

18. A computer readable storage medium comprising computer-executable instructions for performing, on a device capable of accessing data in at least two different protocols, a method comprising:

receiving data relating to a requested site from a user;

requesting data from the requested site according to a first protocol which is compatible with a first browser that the device is presently in a mode for using;

receiving data in response to the request;

determining if the received data is compatible with the first protocol and under which the first browser of the device is operating; and when it is determined that the received data is of a different protocol than the first protocol, performing the following:

flagging the data and resubmitting the request for data according to a second protocol; and switching the device's mode of browser use from the first browser, which is compatible with the first protocol, to use of a second browser, which is compatible with the second protocol.

19. The storage medium according to claim 18, wherein the first protocol is WAP.

20. The storage medium according to claim 19, wherein the second protocol is HTTP.

21. The storage medium according to claim 18, wherein the second protocol is HTTP.

* * * * *

UNITED STATES PATENT AND TRADEMARK OFFICE
CERTIFICATE OF CORRECTION

| | | |
|---|---|---|
| PATENT NO. | : 7,032,036 B2 | Page 1 of 1 |
| APPLICATION NO. | : 10/175776 | |
| DATED | : April 18, 2006 | |
| INVENTOR(S) | : David J. Linsley | |

It is certified that error appears in the above-identified patent and that said Letters Patent is hereby corrected as shown below:

On the face page, in field (56), under "U.S. Patent Documents", in column 1, line 10, delete "B1" and insert -- B2 --, therefor.

In column 5, line 33, in Claim 11, after "user" insert -- ; --.

Signed and Sealed this

Thirtieth Day of March, 2010

David J. Kappos
*Director of the United States Patent and Trademark Office*